(12) United States Patent
Agarwala et al.

(10) Patent No.: US 9,866,481 B2
(45) Date of Patent: *Jan. 9, 2018

(54) COMPREHENSIVE BOTTLENECK DETECTION IN A MULTI-TIER ENTERPRISE STORAGE SYSTEM

(71) Applicant: International Business Machines Corporation, Armonk, NY (US)

(72) Inventors: Sandip Agarwala, Cupertino, CA (US); David P. Goodman, Longmont, CO (US); Sandeep Gopisetty, Morgan Hill, CA (US); David D. Weck, Santa Rosa Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 690 days.

This patent is subject to a terminal disclaimer.

(21) Appl. No.: 14/271,572

(22) Filed: May 7, 2014

(65) Prior Publication Data

US 2014/0330961 A1  Nov. 6, 2014

Related U.S. Application Data

(63) Continuation of application No. 13/044,048, filed on Mar. 9, 2011, now Pat. No. 8,756,310.

(51) Int. Cl.
*G06F 15/173* (2006.01)
*H04L 12/801* (2013.01)
(Continued)

(52) U.S. Cl.
CPC ............ *H04L 47/11* (2013.01); *G06F 9/5072* (2013.01); *G06F 11/3442* (2013.01);
(Continued)

(58) Field of Classification Search
CPC .................. H04L 43/0882; G06F 11/3442
(Continued)

(56) References Cited

U.S. PATENT DOCUMENTS

| 6,067,412 A * | 5/2000 | Blake ................. G06F 11/3409 714/E11.192 |
| 6,434,613 B1 * | 8/2002 | Bertram ............. G06F 11/3433 709/220 |

(Continued)

OTHER PUBLICATIONS

Michael T. Martinez, USPTO Office Action, U.S. Appl. No. 13/044,048, dated Sep. 11, 2012, 29 pages.

(Continued)

*Primary Examiner* — Imad Hussain
(74) *Attorney, Agent, or Firm* — William H. Hartwell; Maxine L. Barasch; Keohane & D'Alessandro PLLC

(57) ABSTRACT

Embodiments of the present invention provide approaches (e.g., online methods) to analyze end-to-end performance issues in a multi-tier enterprise storage system (ESS), such as a storage cloud, where data may be distributed across multiple storage components. Specifically, performance and configuration data from different storage components (e.g., nodes) is collected and analyzed to identify nodes that are becoming (or may become) performance bottlenecks. In a typical embodiment, a set of components distributed among a set of tiers of an ESS is identified. For each component, a total capacity and a current load are determined. Based on these values, a utilization of each component is determined. Comparison of the utilization with a predetermined threshold and/or analysis of historical data allows one or more components causing a bottleneck to be identified.

20 Claims, 6 Drawing Sheets

(51) Int. Cl.
  *H04L 12/26* (2006.01)
  *H04L 12/24* (2006.01)
  *G06F 9/50* (2006.01)
  *G06F 11/34* (2006.01)

(52) U.S. Cl.
  CPC ........ *H04L 41/147* (2013.01); *H04L 43/0882* (2013.01); *G06F 11/3495* (2013.01)

(58) Field of Classification Search
  USPC ........................................................ 709/224
  See application file for complete search history.

(56) References Cited

U.S. PATENT DOCUMENTS

| | | | |
|---|---|---|---|
| 6,557,035 B1* | 4/2003 | McKnight | G06F 11/3452 709/202 |
| 7,181,578 B1* | 2/2007 | Guha | G06F 3/0607 711/154 |
| 7,257,694 B2 | 8/2007 | Serizawa et al. | |
| 7,277,826 B2 | 10/2007 | Castelli et al. | |
| 7,434,017 B2 | 10/2008 | Maruyama et al. | |
| 7,441,009 B2 | 10/2008 | Shinohara | |
| 7,624,178 B2 | 11/2009 | Tevis | |
| 7,636,764 B1 | 12/2009 | Fein et al. | |
| 7,640,342 B1* | 12/2009 | Aharoni | G06F 3/0605 370/237 |
| 7,894,361 B1* | 2/2011 | Bhan | H04L 41/145 370/252 |
| 8,103,685 B1* | 1/2012 | Farizon | G06Q 10/06 707/751 |
| 8,756,310 B2 | 6/2014 | Agarwala | H04L 43/0882 709/224 |
| 2002/0013832 A1 | 1/2002 | Hubbard | |
| 2003/0115244 A1* | 6/2003 | Molloy | G06F 9/505 718/105 |
| 2003/0208592 A1* | 11/2003 | Taylor | H04L 41/147 709/224 |
| 2004/0088284 A1* | 5/2004 | Gourlay | H04L 67/1097 |
| 2004/0128396 A1* | 7/2004 | Patrick | H04L 29/06027 709/231 |
| 2005/0050404 A1* | 3/2005 | Castelli | G06F 11/3409 714/57 |
| 2005/0262386 A1* | 11/2005 | Numanoi | G06F 11/0727 714/5.11 |
| 2006/0010233 A1* | 1/2006 | Fellenstein | G06F 11/3414 709/224 |
| 2006/0101204 A1 | 5/2006 | Bao | |
| 2006/0171334 A1* | 8/2006 | Hirata | G06F 11/3433 370/254 |
| 2007/0208920 A1* | 9/2007 | Tevis | H04L 43/16 711/170 |
| 2007/0226631 A1* | 9/2007 | Tevis | H04L 43/16 715/736 |
| 2008/0120435 A1* | 5/2008 | Moreira | G06F 17/30171 710/1 |
| 2008/0133321 A1 | 6/2008 | Pennock et al. | |
| 2008/0133347 A1 | 6/2008 | Josifovski et al. | |
| 2008/0133348 A1 | 6/2008 | Reed et al. | |
| 2008/0148270 A1* | 6/2008 | Gopisetty | G06F 3/0605 718/104 |
| 2009/0012855 A1 | 1/2009 | Jamal et al. | |
| 2009/0113294 A1 | 4/2009 | Sanghavi et al. | |
| 2009/0185488 A1* | 7/2009 | Beverly | H04L 47/10 370/236 |
| 2009/0210937 A1 | 8/2009 | Kraft et al. | |
| 2009/0300173 A1* | 12/2009 | Bakman | G06F 11/008 709/224 |
| 2009/0319271 A1 | 12/2009 | Gross | |
| 2009/0328150 A1 | 12/2009 | Gross | |
| 2010/0057913 A1 | 3/2010 | DeHaan | |
| 2010/0058332 A1 | 3/2010 | DeHaan | |
| 2010/0082300 A1* | 4/2010 | Hollingsworth | G06F 3/0605 702/186 |
| 2010/0125473 A1 | 5/2010 | Tung et al. | |
| 2010/0268816 A1* | 10/2010 | Tarui | H04L 12/00 709/224 |
| 2010/0333116 A1 | 12/2010 | Prahlad et al. | |
| 2011/0131322 A1* | 6/2011 | Aust | H04L 67/1097 709/224 |
| 2011/0202650 A1* | 8/2011 | Abraham | H04L 43/026 709/224 |
| 2011/0213880 A1* | 9/2011 | Neuse | H04L 41/082 709/224 |
| 2011/0296422 A1 | 12/2011 | Hildebrand et al. | |
| 2012/0047346 A1* | 2/2012 | Kawaguchi | G06F 3/0605 711/165 |
| 2012/0054362 A1* | 3/2012 | Tsao | H04L 12/66 709/232 |
| 2012/0072581 A1 | 3/2012 | Tung et al. | |
| 2012/0151053 A1* | 6/2012 | Kato | G06F 11/3409 709/224 |

OTHER PUBLICATIONS

Imad Hussain, USPTO Final Office Action, U.S. Appl. No. 13/044,048, dated May 3, 2013, 20 pages.
Imad Hussain, USPTO Office Action, U.S. Appl. No. 13/044,048, dated Oct. 8, 2013, 21 pages.
Imad Hussain, Notice of Allowance and Fee(s) Due, U.S. Appl. No. 13/044,048, dated Feb. 6, 2014, 19 pages.
Marcos K. Aguilera et al., "Improving recoverability in multi-tier storage systems", Proceedings of the 37th Annual IEEE/IFIP, International Conference on Dependable Systems and Networks, 2007, 10 pages.
Fesehaye et al., "A Scalable Distributed File System for Cloud Computing", 2010, 8 pages.
Ananthanarayanan et al., "Cloud analytics: Do we really need to reinvent the storage stack?", 2009, 10 pages.

* cited by examiner

COMPREHENSIVE BOTTLENECK DETECTION IN A MULTI-TIER ENTERPRISE STORAGE SYSTEM

RELATED U.S. APPLICATION DATA

The present patent document is a continuation of U.S. patent application Ser. No. 13/044,048, filed Mar. 9, 2011, entitled "COMPREHENSIVE BOTTLENECK DETECTION IN A MULTI-TIER ENTERPRISE STORAGE SYSTEM", the disclosure of which is incorporated herein by reference.

TECHNICAL FIELD

The present invention generally relates to storage bottleneck detection. Specifically, the present invention relates to end-to-end bottleneck detection in a multi-tier enterprise storage system (ESS) such as a storage cloud in a cloud computing environment.

BACKGROUND

The cloud computing environment is an enhancement to the predecessor grid environment, whereby multiple grids and other computation resources may be further abstracted by a cloud layer, thus making disparate devices appear to an end-consumer as a single pool of seamless resources. These resources may include such things as physical or logical compute engines, servers and devices, device memory, storage devices.

As enterprise storage clouds grow bigger in size, it becomes increasingly difficult to debug performance issues. Specifically, workload data may be distributed across multiple redundant components, and a single input/output (I/O) request may span multiple tiers of software and hardware components. When a storage workload experiences performance issues, it is quite challenging to accurately pinpoint the problematic node(s) (e.g., those that are causing the issues). Existing approaches rely upon methods that analyze logs from individual components. Such an approach may not readily identify a route cause of performance issues and may not scale well with respect to ESS capacity.

SUMMARY

Embodiments of the present invention provide approaches (e.g., online methods) to analyze end-to-end performance issues in a multi-tier enterprise storage system (ESS), such as a storage cloud, where data may be distributed across multiple storage components. Specifically, performance and configuration data from different storage components (e.g., nodes) is collected and analyzed to identify nodes that are becoming (or may become) performance bottlenecks. In a typical embodiment, a set of components distributed among a set of tiers of an ESS is identified. For each component, a total capacity and a current load are determined. Based on these values, a utilization of each component is determined. Comparison of the utilization with a predetermined threshold and/or analysis of historical data allows one or more components causing a bottleneck to be identified.

A first aspect of the present invention provides a method for detecting a bottleneck in a multi-tier enterprise storage system (ESS), comprising: identifying a set of components distributed among a set of tiers in the multi-tier ESS; determining a total capacity of each of the set of components based on a corresponding set of component models; determining a current load on each of the set of components; determining a utilization of each of the set of components based on the total capacity and the current load; and identifying at least one component from the set of components causing the bottleneck based on the utilization.

A second aspect of the present invention provides a system for detecting a bottleneck in a multi-tier enterprise storage system (ESS), comprising: a bus; a processor coupled to the bus; and a memory medium coupled to the bus, the memory medium comprising instructions to: identify a set of components distributed among a set of tiers in the multi-tier ESS; determine a total capacity of each of the set of components based on a corresponding set of component models; determine a current load on each of the set of components; determine a utilization of each of the set of components based on the total capacity and the current load; and identify at least one component from the set of components causing the bottleneck based on the utilization.

A third aspect of the present invention provides a computer program product for detecting a bottleneck in a multi-tier enterprise storage system (ESS), the computer program product comprising a computer readable storage media, and program instructions stored on the computer readable storage media, to: identify a set of components distributed among a set of tiers in the multi-tier ESS; determine a total capacity of each of the set of components based on a corresponding set of component models; determine a current load on each of the set of components; determine a utilization of each of the set of components based on the total capacity and the current load; and identify at least one component from the set of components causing the bottleneck based on the utilization.

A fourth aspect of the present invention provides a method for deploying a system for detecting a bottleneck in a multi-tier enterprise storage system (ESS), comprising: providing a computer infrastructure being operable to: identify a set of components distributed among a set of tiers in the multi-tier ESS; determine a total capacity of each of the set of components based on a corresponding set of component models; determine a current load on each of the set of components; determine a utilization of each of the set of components based on the total capacity and the current load; and identify at least one component from the set of components causing the bottleneck based on the utilization.

BRIEF DESCRIPTION OF THE DRAWINGS

These and other features of this invention will be more readily understood from the following detailed description of the various aspects of the invention taken in conjunction with the accompanying drawings in which.

Figure 1:
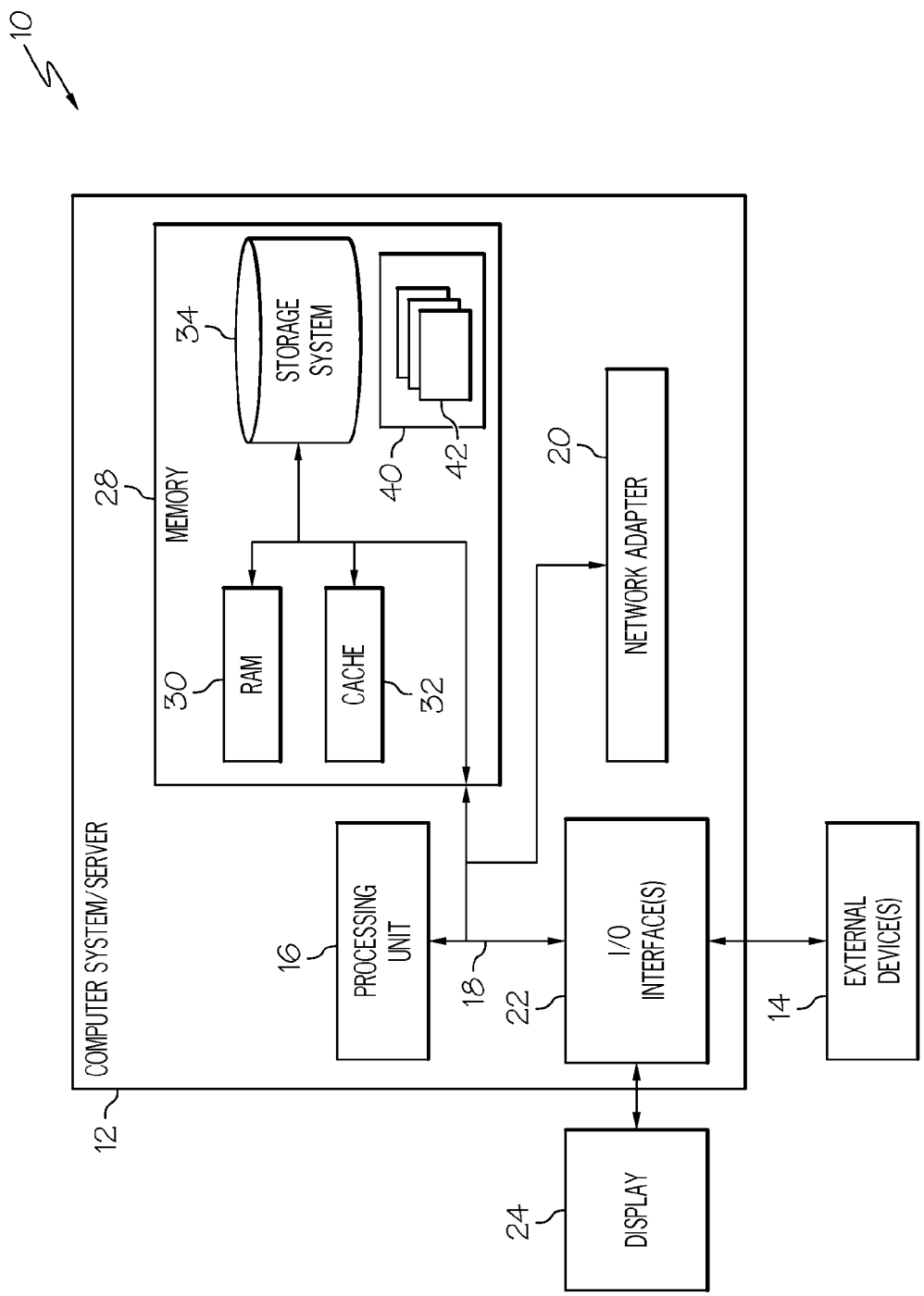
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Enterprise storage clouds are typically composed of a large number of interconnected components such as servers, switches, raid arrays, disks, etc. Over a period of time, some of these components may become a performance bottleneck. This may be due to change in workload, system misconfigurations, component failure, etc. A bottleneck-causing component may deteriorate cloud performance, reduce availability, or result in service level agreement (SLA) violation. These may further lead to loss in revenue, customer dissatisfaction, etc.

Embodiments of the present invention provide approaches (e.g., online methods) to analyze end-to-end performance issues in a multi-tier enterprise storage system (ESS), such as a storage cloud, where data may be distributed across multiple storage components. Specifically, performance and configuration data from different storage components (e.g., nodes) is collected and analyzed to identify nodes that are becoming (or may become) performance bottlenecks. In a typical embodiment, a set of components distributed among a set of tiers of an ESS is identified. For each component, a total capacity and a current load are determined. Based on these values, a utilization of each component is determined. Comparison of the utilization with a predetermined threshold and/or analysis of historical data allows one or more components causing a bottleneck to be identified.

Traditional methods of detecting bottleneck include manually analyzing component logs and health status by skilled system administrators. These can be, however, costly, tedious, slow, and/or error-prone. Embodiments of the present invention thus provide a systematic approach for detecting performance bottlenecks in a storage cloud environment. It is understood that although this approach is described in the context of a general parallel file system (GPFS)-based storage cloud, this need not be the case. Rather, the concepts described herein are applicable to most file systems. One differentiating factor of the embodiments of the present invention approach is the end-to-end analysis to detect problematic symptoms.

It is further understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
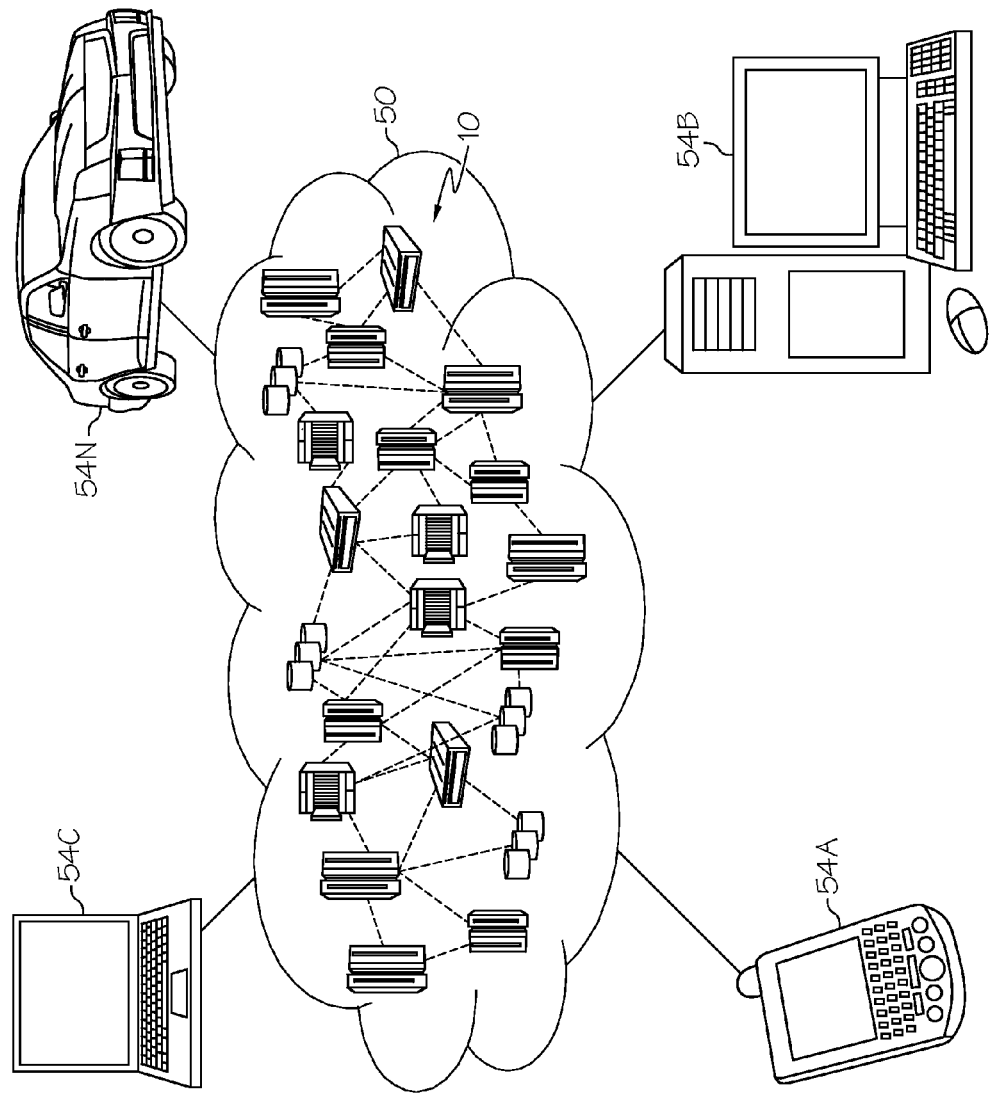
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
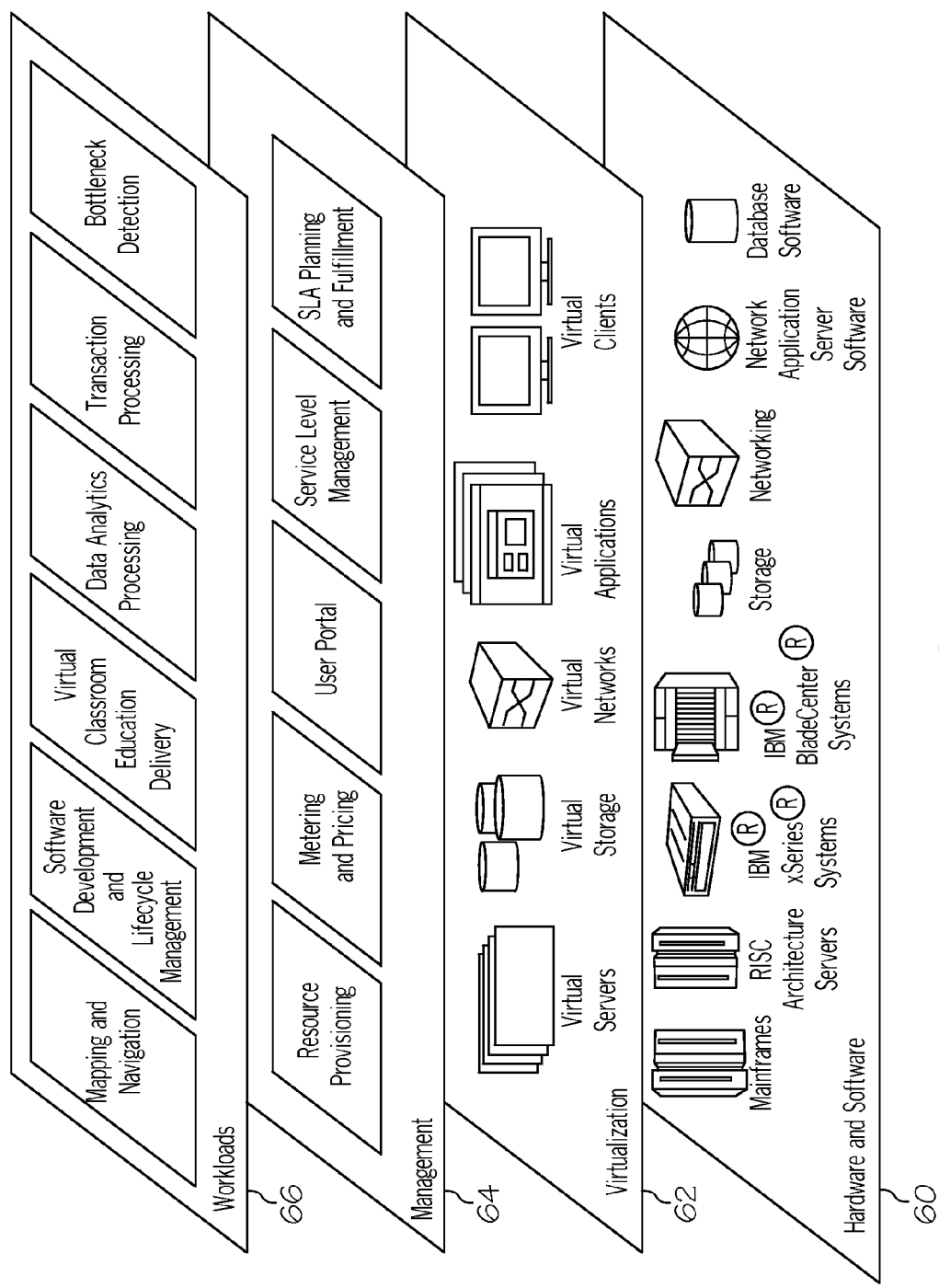
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and bottleneck detection. As mentioned above, all of the foregoing examples described with respect to FIG. 3 are illustrative only, and the invention is not limited to these examples.

It is understood that all functions of the present invention as described herein typically may be performed by the bottleneck detection functionality, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
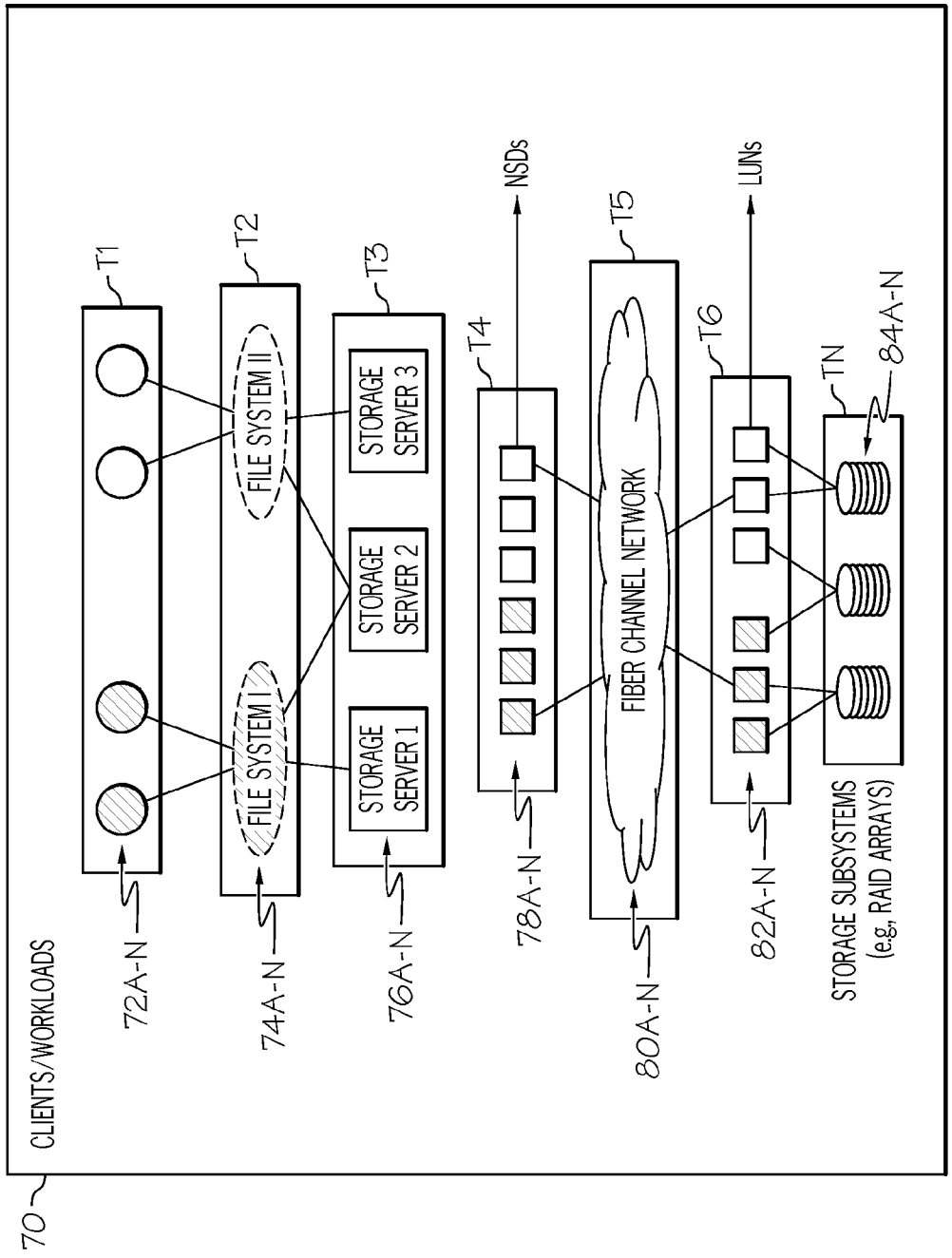
FIG. 4 depicts a multi-tier enterprise storage system (ESS) according to an embodiment of the present invention.

Referring to FIG. 4, an ESS 70 according to an embodiment is depicted. In general, ESS 70 is a general parallel file system (GPFS) that comprises multiple tiers T1-TN of storage components. Specifically, ESS 70 comprises: a clients/workloads tier T1 having a set (at least one) of clients/workloads 72A-N; a file system tier T2 having a set of file systems 74A-N; a storage server tier T3 comprising a set of storage servers 76A-N; a network shared disk (NSD) tier T4 comprising a set of NSDs 78A-N, a network tier T5 comprising at least one communication network 80A-N such as a fibre channel network; a logical unit number (LUN) tier T6 comprising a set of LUN nodes 82A-N, and a storage subsystem tier TN comprising a set of storage subsystems 84A-N such as one or more sets of redundant arrays of independent disks (RAIDs).

Cluster file systems such as the GPFS shown in FIG. 4 typically employ a shared disk architecture where data is located across multiple disks and accessed via multiple storage servers in parallel. This typically provides higher performance and improved load balancing and fault tolerance capabilities. This configuration can also result in system management challenges, one of which is detecting performance bottlenecks. In an optimal environment, each storage server and underlying disk would be equally loaded and performance bottlenecks should be absent. But with gradual usage, one storage server may become more loaded than another. Similarly, one disk may have more I/O activity than the other. This can happen for many reasons:

Failures: Some servers or disks may fail, which causes a shift in workload.

Workload asymmetry: Some data within the same file system may be accessed more often than the other. This results in more input/output (I/O) activities in the disks containing active data.

Storage mis-configuration: File systems may not be appropriately provisioned for their workload. For example, a file system with two disks may be able to handle a capacity requirement, but not a needed I/O per second (IOPS) rate resulting in the disks becoming a bottleneck.

Same resources shared across multiple workloads.

Change in workload behavior, etc.

In order to detect performance bottlenecking in a storage cloud, embodiments of the present invention analyze a load and a capacity on each component (both physical and logical) across multi-tier ESS 70. In general, an ESS such as a GPFS distributes I/O load across multiple storage servers and storage disks, with at least one difference:

I/O load on a storage server is based on disk connectivity and the load on other storage servers. In general, a GPFS attempts to distribute I/O traffic across all storage servers evenly. However, asymmetry may arise when all disks are not connected to all storage servers or file systems are configured to use only a subset of available storage servers. These may be necessary for performance isolation or quality of service (QoS) requirements and may result in load imbalance among different storage servers.

A GPFS distributes all file system data across disks belonging to that file system. If any one of the disks of a file system slows down or becomes overloaded, such performance degradation can negatively impact the overall file system performance. Therefore, the maximum performance is dictated by the performance of the slowest disks.

Figure 5:
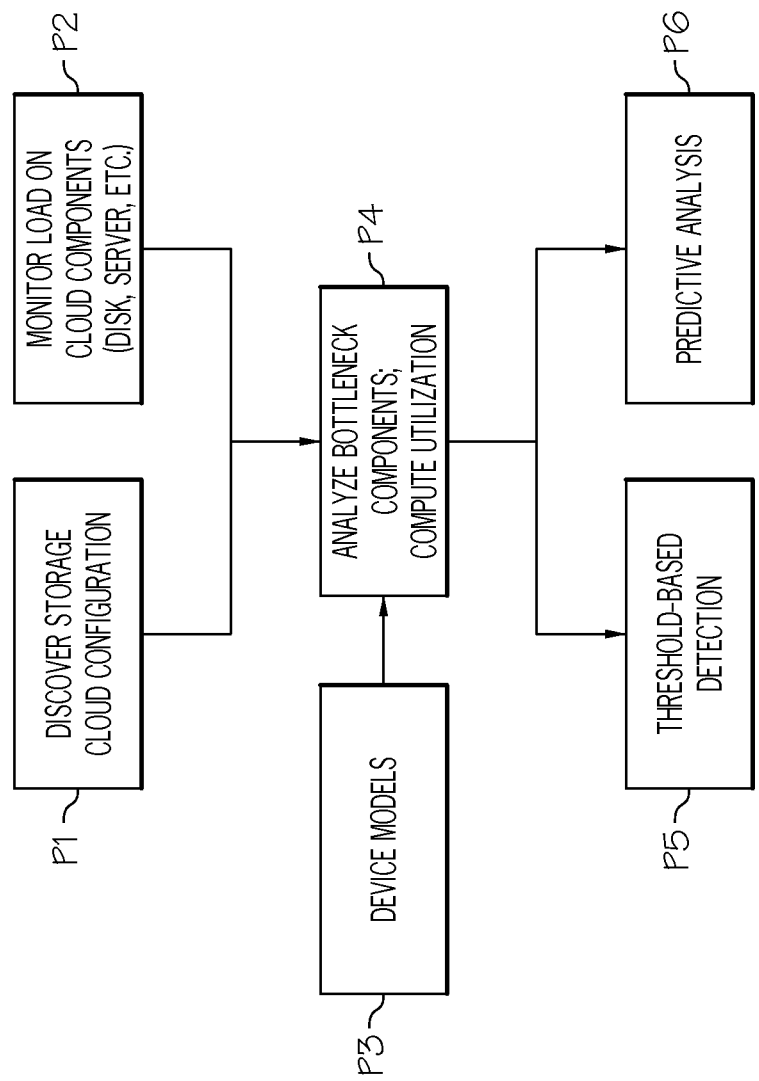
FIG. 5 depicts a process flow diagram according to an embodiment of the present invention.

Referring now to FIG. 5, a process flow diagram according to the present invention is shown. As depicted in step P1, a storage cloud configuration is discovered. Specifically, the components in ESS 70 (FIG. 4) are identified, and in step P2, a current load across the identified components is determined. In step P3, based on device/component models, a capacity of each of the components is determined. Based on this information, a utilization of each component is determined in step P4. Specifically, utilization generally comprises a ratio of the current load to the total capacity. Then, based on a comparison to a predetermined threshold in step P5, and/or historical data in P6, one or more components causing a bottleneck (or likely to cause a future bottleneck) will be identified. The use of historical data can indicate at which utilization a component has failed and/or caused a bottleneck in the past.

These concepts will be further described in conjunction with the following algorithmic process:
Let the expression $$I_i^d$$

denote the load on disk 'i'.
Further, let the expression $$C_i^d$$

denote the performance capacity of disk 'i'.
Therefore, utilization of disk 'i' can be defined as:

$$U_i^d = \frac{I_i^d}{C_i^d}$$

It is noted that the utilization defined above is the utilization at the physical disk level and need now be applied at the NSD (or LUN) level. This is due to the fact that LUNs are created out of a disk array, which are collection of disks in a "just a bunch of disks" (JBOD) or RAID configuration. Multiple LUNs may be created out of a same disk array. This means that even if there is no activity in one LUN, the underlying disk may still be busy because of I/Os from other LUNs.

Regardless, available disk bandwidth for a file system with 'n' disks can be defined as follows:

$$A^f = n \cdot [\text{Min}_i^{\text{Lists of disks}}(C_i^s - I_i^s)]$$

Therefore, a bottleneck-causing disk is the one with minimum available I/O capacity.

The storage server utilization, similarly, can be defined as follows:

$$U_i^s = \frac{I_i^s}{C_i^s}$$

where the expression $$I_i^s$$

denotes the I/O load on storage server 'i' and the expression $$C_i^s$$

denotes the I/O capacity of storage server 'i'.

For a disk or a server to be considered a bottleneck resource, the algorithm(s) herein can implement at least two approaches:

A threshold-based approach where the available capacity goes below a certain threshold; and/or A predictive approach where the workload on the components is predicted based on historical load.

If the predicted load exceeds the capacity, that component is a potential bottleneck. This prevents a scenario where a component may cross threshold level for some temporary changes in workload but is otherwise well-provisioned.

Figure 6:
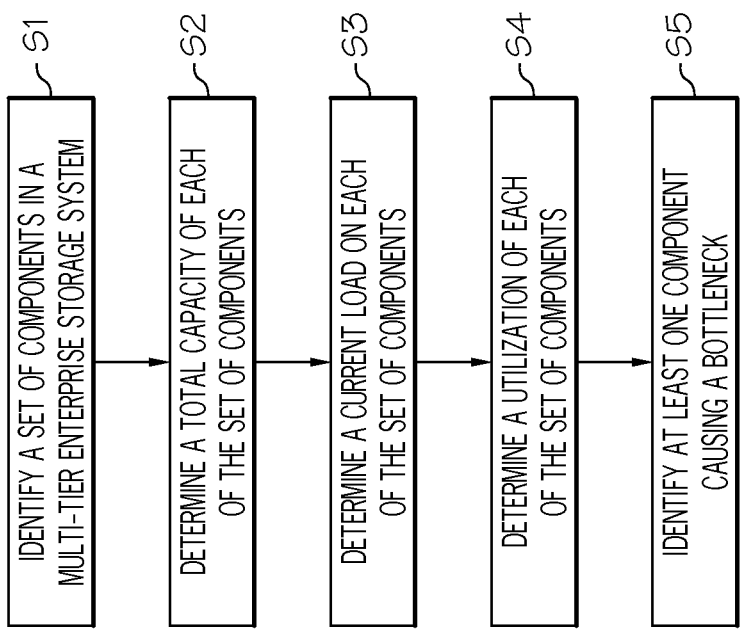
FIG. 6 depicts a method flow diagram according to an embodiment of the present invention.

Referring now to FIG. 6, a method flow diagram according to an embodiment of the present invention is shown. As depicted, in step S1, a set of components distributed among a set of tiers in the multi-tier ESS is identified. In step S2, a total capacity of each of the set of components is determined based on a corresponding set of component models. In step S3, a current load on each of the set of components is determined. In step S4, a utilization of each of the set of components is determined based on the total capacity and the current load. In step S5, at least one component is identified from the set of components causing the bottleneck based on the utilization.

While shown and described herein as a bottleneck detection solution, it is understood that the invention further provides various alternative embodiments. For example, in one embodiment, the invention provides a computer-readable/useable medium that includes computer program code to enable a computer infrastructure to provide bottleneck detection functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide bottleneck detection functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for bottleneck detection. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for detecting a bottleneck in a multi-tier enterprise storage system (ESS), comprising:
   identifying a set of components distributed among a set of tiers in the multi-tier ESS;
   determining a total capacity of each of the set of components based on a corresponding set of component models;
   determining a current load on each of the set of components;
   determining, based on the total capacity and the current load, a utilization measurement for each of the set of components, the determining comprising an analysis of a utilization at a physical disk level, and an analysis of a utilization at at least one of a network shared disk level and a logical unit number level;
   identifying at least one component, from the set of components, causing the bottleneck based on the utilization measurement;
   determining whether the bottleneck is temporary by comparing a predicted load of the at least one component to the total capacity of the at least one component; and
   providing remediation for the identified at least one component if the bottleneck is determined not to be temporary.

2. The method of claim 1, the ESS comprising a general parallel file system (GPFS).

3. The method of claim 1, the set or tiers comprising a file system tier, a storage server tier, a network shared disk (NSD) tier, a network tier, a logical unit number (LUN) tier, and a storage subsystem tier.

4. The method of claim 1, the set of tiers further comprising a client tier.

5. The method of claim 1, further comprising predicting a future bottleneck based on historical utilization data.

6. The method of claim 1, the utilization comprising a ratio of the current load to the total capacity, and the at least one component being identified based on a comparison of the utilization to a predetermined threshold.

7. The method of claim 1, further comprising computing an available bandwidth for each of the set of components by determining a difference between the total capacity and the current load.

8. The method of claim 1, wherein a service solution provider provides a computer infrastructure that performs the method for one or more consumers.

9. A system for detecting a bottleneck in a multi-tier enterprise storage system (ESS), comprising:
　a bus;
　a processor coupled to the bus; and
　a memory medium coupled to the bus, the memory medium comprising instructions to:
　　identify a set of components distributed among a set of tiers in the multi-tier ESS;
　　determine a total capacity of each of the set of components based on a corresponding set of component models;
　　determine a current load on each of the set of components;
　　determine, based on the total capacity and the current load, a utilization measurement for each of the set of components, the determining comprising an analysis of a utilization at a physical disk level, and an analysis of a utilization at at least one of a network shared disk level and a logical unit number level;
　　identify at least one component, from the set of components, causing the bottleneck based on the utilization measurement;
　　determine whether the bottleneck is temporary by comparing a predicted load of the at least one component to the total capacity of the at least one component; and
　　provide remediation for the identified at least one component if the bottleneck is determined not to be temporary.

10. The system of claim 9, the ESS comprising a general parallel file system (GPFS).

11. The system of claim 9, the set or tiers comprising a file system tier, a storage server tier, a network shared disk (NSD) tier, a network tier, a logical unit number (LUN) tier, and a storage subsystem tier.

12. The system of claim 9, the set of tiers further comprising a client tier.

13. The system of claim 9, further comprising predicting a future bottleneck based on historical utilization data.

14. The system of claim 9, the utilization comprising a ratio of the current load to the total capacity, and the at least one component being identified based on a comparison of the utilization to a predetermined threshold.

15. A computer program product for detecting a bottleneck in a multi-tier enterprise storage system (ESS), the computer program product comprising a computer readable storage media, and program instructions stored on the computer readable storage media, to:
　identify a set of components distributed among a set of tiers in the multi-tier ESS;
　determine a total capacity of each of the set of components based on a corresponding set of component models;
　determine a current load on each of the set of components;
　determine, based on the total capacity and the current load, a utilization measurement for each of the set of components, the determining comprising an analysis of a utilization at a physical disk level, and an analysis of a utilization at at least one of a network shared disk level and a logical unit number level;
　identify at least one component, from the set of components, causing the bottleneck based on the utilization measurement;
　determine whether the bottleneck is temporary by comparing a predicted load of the at least one component to the total capacity of the at least one component; and
　provide remediation for the identified at least one component if the bottleneck is determined not to be temporary.

16. The computer program product of claim 15, the ESS comprising a general parallel file system (GPFS).

17. The computer program product of claim 15, the set or tiers comprising a file system tier, a storage server tier, a network shared disk (NSD) tier, a network tier, a logical unit number (LUN) tier, and a storage subsystem tier.

18. The computer program product of claim 15, the set of tiers further comprising a client tier.

19. The computer program product of claim 15, further comprising predicting a future bottleneck based on historical utilization data.

20. The computer program product of claim 15, the utilization comprising a ratio of the current load to the total capacity, and the at least one component being identified based on a comparison of the utilization to a predetermined threshold.

* * * * *